United States Patent [19]

Carrington

[11] Patent Number: 4,976,516

[45] Date of Patent: Dec. 11, 1990

[54] DISPLAY DEVICE

[75] Inventor: Andrew N. Carrington, Hemel Hempstead, England

[73] Assignee: Thorn EMI plc, London, England

[21] Appl. No.: 356,297

[22] Filed: May 24, 1989

[30] Foreign Application Priority Data

May 24, 1988 [GB] United Kingdom ............... 8812262

[51] Int. Cl.$^5$ ............................................. G02F 1/13
[52] U.S. Cl. .................................................. 350/343
[58] Field of Search ....................... 350/343, 344, 334

[56] References Cited

U.S. PATENT DOCUMENTS

| 3,990,781 | 11/1976 | Gum | 350/343 |
| 3,995,941 | 12/1976 | Nagahara et al. | 350/343 X |
| 4,297,401 | 10/1987 | Chern et al. | 350/343 X |
| 4,401,537 | 8/1983 | Chern et al. | 350/343 |
| 4,407,870 | 10/1983 | Clerc et al. | 350/343 X |
| 4,443,063 | 4/1984 | Nishiyama | 350/334 |

FOREIGN PATENT DOCUMENTS

| 0048337 | 4/1977 | Japan | 350/343 |
| 1349921 | 4/1974 | United Kingdom . | |

Primary Examiner—Stanley D. Miller
Assistant Examiner—Huy K. Mai
Attorney, Agent, or Firm—Fleit, Jacobson, Cohn, Price, Holman & Stern

[57] ABSTRACT

A liquid crystal display cell comprises first and second substrates located in a substantially parallel relative arrangement to define an active display region therebetween when filled with liquid crystal material. The cell further includes means to effect filling of the active display region with liquid crystal material from at least a part of an edge of the active display rgion.

15 Claims, 3 Drawing Sheets

DISPLAY DEVICE

The present invention relates to a liquid crystal device and to a method of filling such a liquid crystal device.

Most liquid crystal cells presently commercially available contain materials that are in the nematic phase at room temperature, the cell spacing being typically of the order of 5 microns or more. As the liquid crystal materials are of low viscosity, nematic cells can be quickly and easily filled using standard vacuum backfilling techniques wherein the cell is evacuated inside a vacuum chamber, then one edge of the cell is lowered into a bath of the liquid crystal material so that the fill hole in that edge is fully immersed, and the vacuum chamber is then let up to atmosphere, the pressure difference between the cell and surroundings forcing the material into the cell. For a cell 8 cm square this may typically take 5 minutes at room temperature.

Certain other liquid crystal materials, which have great potential for high multiplexability and a consequent capability for high information content displays, for example smectic liquid crystal materials (especially the ferroelectric smectic C materials) have high viscosities compared with nematics. Moreover the ferroelectric materials currently used require cell spacings of nominally 2 microns. Accordingly, the filling rate of a cell by the conventional method is virtually zero at room temperature. The viscosity of the material can be reduced a certain amount by raising its temperature so that it is in the nematic or isotropic phase, but its viscosity at these temperatures can still be higher than materials used in nematic devices. Indeed, it can take over 1 hour to backfill a cell 8 cm×8 cm and then there is usually an area at the top of the cell which remains unfilled.

An object of the present invention is to overcome the difficulties encountered by the prior art.

One aspect of the present invention provides a liquid crystal display cell comprising first and second substrates located in a substantially parallel relative arrangement to define an active display region threbetween when filled with liquid crystal material, and means to effect filling of the active display region with liquid crystal material from at least a part of an edge of the active display region.

The inventor has appreciated that one significant characteristic contributing to the difficulties encountered in the prior art is the thin spacing between the substrates of the liquid crystal display cell and hence the small cross-sectional area of the fill-hole through which the liquid crystal material can flow. These difficulties are alleviated in the liquid crystal display cell provided in accordance with the present invention by the provision of means to effect filling of the active display region with liquid crystal material from at least a part of an edge of the active display region which increases the cross-sectional area into the active display region through which liquid crystal material can flow.

Preferably the filling means comprises a reservoir intermediate the first and second substrates, the reservoir having an outlet port which extends along at least a part of an edge of the active display region. This preferred embodiment is one arrangement by which the active display region can be filled from at least a part of its edge without the size of the fill hole being increased. In order for the situation to be improved by simply increasing the size of the fill hole, the fill hole would need to be substantially the size of the cell edge before any significant improvement can be achieved; such a size of fill hole is wholly impractical because the cell would then be unstable and liable to flexion, causing thickness non-uniformities. Moreover, it would be difficult and undesirable to provide a source of liquid crystal material which would be sufficiently large for a large fill hole but which would prevent gas or air entering the cell. In the preferred embodiment, the reservoir provides a large source of liquid crystal material internal to the cell from which the active display region may be filled.

Preferably the reservoir has a width, in the dimension corresponding to the gap between the substrates in the active display region, much greater than the thickness of the gap. Accordingly, the liquid crystal material can readily and quickly flow into the reservoir, and then on into the active display region.

The part of the reservoir having this greater width may be connected to the active display region by another part of narrower width. Alternatively, in a preferred embodiment, the outlet port of the reservoir adjacent the active display region has this greater width.

Thus for example the outlet port may extend along substantially the whole of two sides of the active display region, thereby forming a shape generally similar to the capital letter L when the cell is viewed in plan. In an alternative example, the outlet port may extend along substantially the whole of three sides of the active display region, thereby forming a shape generally similar to the capital letter U when the cell is viewed in plan. In another alternative example, the outlet port may extend substantially parallel to a diagonal of the cell.

Preferably, at least one of the substrates includes, on that side corresponding to the interior of the cell, a section indented relative to the active displaY region of the substrate, thereby to form the reservoir. Advantageously, the substrate has one or more layers to effect colour filtering for the cell in the active display region, this layering forming or contributing to the stepped disposition between the active display region and the indented section. Additionally or alternatively, the substrate(s) may comprise a portion which has been recessed (e.g. by milling, drilling or etching) to form the reservoir.

Preferably, one of the substrates has an aperture effective as a fill hole in communication with the reservoir. This further reduces the risk of inflexion.

Preferably the cell further comprises a vacuum hole. The advantages of a liquid crystal display cell provided in accordance with the present invention are evident when the cell is filled by the back-filling technique. The provision of a vacuum hole allows a suction pressure to be applied while the cell is being filled.

Preferably, the cell has a channel of an increased width, in the respective dimension, to the gap between the substrates in the active display region, the channel being in communication with the vacuum hole (which is preferably disposed in one of the substrates) of the cell. The channel may be in a form corresponding to any of the structures for the reservoir.

While FIGS. 6 and 7 of British Patent Specification No. 1349921 shows cells whose structures superficially appear similar to embodiments of the present invention, this document is concerned with ensuring a laminar flow of the fluid suspension over the active display region while there is continuous re-cycling pumping of the suspension through the system. Neither the size of the structure, nor the form of the suspension, bears any practical or technical relation to the type of cell or liquid crystal material with which the present invention is concerned.

The present invention also provides a method of filling a liquid crystal display cell comprising first and second substrates located in a substantially parallel relative arrangement to define an active display region therebetween when filled with liquid crystal material, the method comprising filling the cell with liquid crystal material from at least a part of an edge of the active display region.

In a preferred embodiment, the method includes filling a reservoir intermediate the first and second substrates, the reservoir having an outlet port which extends along at least a part of an edge the active display region.

The present invention also embodies a cell produced by the filling method herein defined.

Another aspect of the present invention provides a liquid crystal display cell comprising two cell substrates for location in a substantially parallel relative arrangement to define an active display region therebetween when filled with liquid crystal material, and means to provide a filling front of liquid crystal material during filling of the cell with liquid crystal material, which filling front is not substantially parallel to a side of the cell and/or the active region thereof.

Thus for example the means to provide a non-parallel filling front may comprise any of the reservoirs defined above. Additionally it may comprise an arrangement (for example a reservoir) which provides non-uniform filling along only one edge of the active display region, for example due to non central and/or assymetric positioning of any feed-hole(s).

In order that the invention may be more readily be understood, a description is now given, by way of example only, reference being made to the accompanying drawings, in which.

Figure 1:
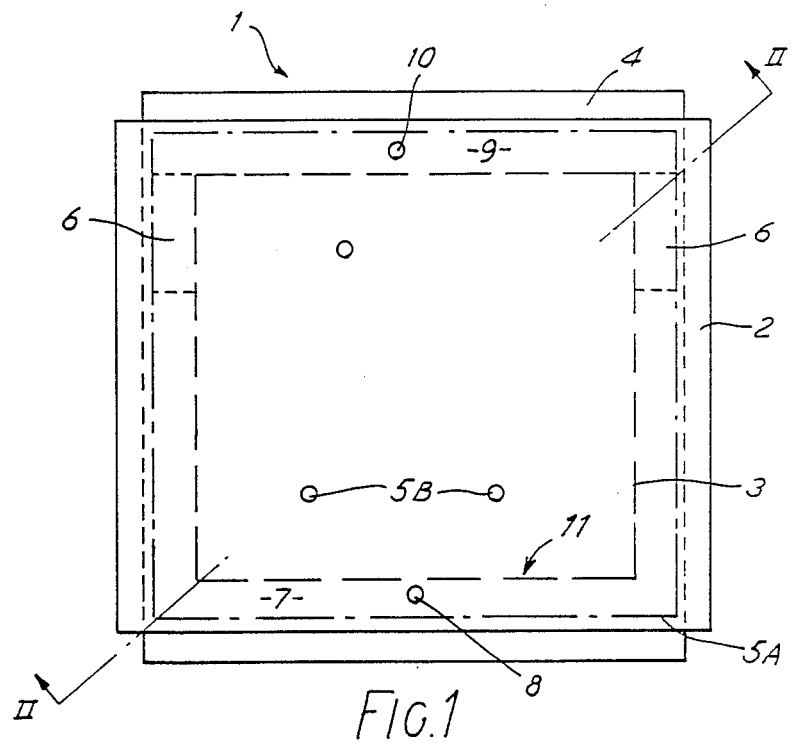
FIG. 1 is a plan view of a liquid crystal cell embodying the present invention.
Figure 2:
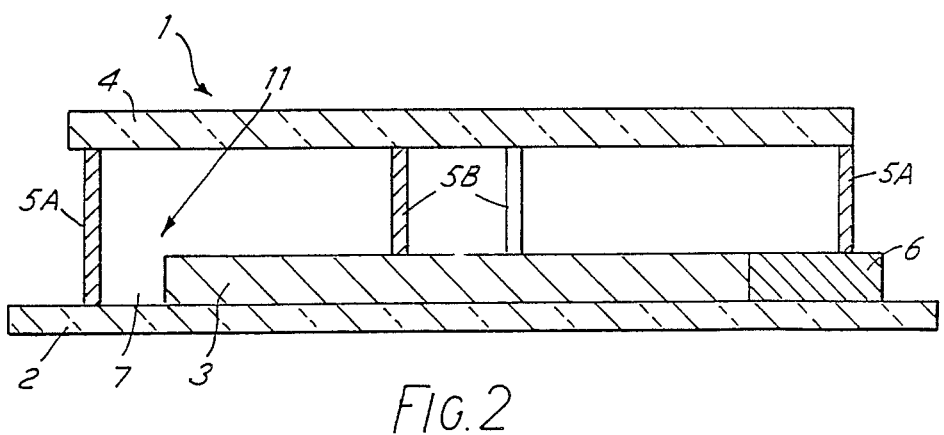
FIG. 2 is a cross-sectional view along the line II—II of FIG. 1.

FIGS. 1 and 2 show a liquid crystal cell 1 (before filling) of dimensions 140 mm×140 mm with a lower glass plate 2 having a series of electrode layers and colour layers (designated generally by reference numeral 3) which define the active display region of the cell. An upper glass plate 4 is maintained parallel to the plate 2 at a separation of 7 $\mu$m by means of an edge seal 5A along the entire periphery of the cell and spacers 5B, such that the gap between layers 3 and plate 4 in the active display region is 2 $\mu$m. Two blocks 6, formed of polymer or other appropriate material, are provided to form two separate channels, one channel constituting a U-shaped reservoir 7 which communicates with a fill-hole 8 in plate 4 and the other channel constituting a vacuum channel 9 which communicates with a vacuum hole 10 in plate 4. The width (as seen in plan in FIG. 1) of the reservoir 7 and vacuum channel 9 is 5 mm, and the polymer blocks 6 (as seen in plan in FIG. 1) are 5 mm by 10 mm. The reservoir 7 has an outlet port 11 into the active display region of the cell.

Figure 3:
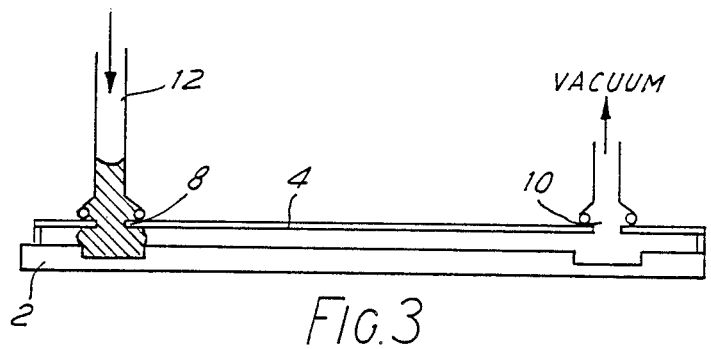
FIG. 3 shows schematically a cell during the filling operation.

To fill cell 1, approximately 0.5 g of smectic-c liquid crystal material is heated into its isotopic state and introduced through a filling tube 12 into fill-hole 8. A vacuum is then applied to vacuum hole 10 (see FIG. 3). Filling of cell 1 is achieved in about 45 minutes, this being approximately one third of the time that would be taken to fill a conventional cell with the same active display region characteristics.

In a modification of the filling operation, initially a low suction pressure is applied to vacuum-hole 10 while liquid crystal material is passing into the reservoir 7 and as it begins entering the active display region via the inlet port 11. Thereafter, the suction pressure applied to vacuum-hole 10 is varied in accordance with any increase in the distance from outlet port 11 to the filling front, thereby to maintain the flow rate; this can be readily achieved with good pumping equipment. In this way, effective filling of the active display area, with a minimisation or elimination of voids or bubbles, can be realised. The increase of pressure at the hole 8 as the cell fills can also maintain the speed of filling front, this being particularly appropriate where the pumping performance of equipment is limited. A small degree of bloating of the cell may occur, but this can readily be eliminated by use of subsequent application of pressure to the outer surfaces of plates 2 and 4.

Thus, the cell 1 has an internal reservoir into which the material can readily flow, and the reservoir provides a large cross-sectional area outlet port from which the material can flow while maintaining the structure of the cell rigid (thereby reducing thickness non-uniformity problems). Moreover, by filling the reservoir through a small hole, the likelihood of air entering the reservoir is reduced; if air does get into the cell, there is probably enough material in the reservoir to absorb it.

Moreover the filling operation of cell 1 provides a substantial reduction in the problem of voids around metallisation strips in the cell; it is believed that this is due to the increased filling speed produced by reservoir 7. Furthermore, the provision of vacuum channel 9 inhibits the progress of the filling front as it enters that channel and allows the parts of the front still progressing through the active display region to catch up, thereby inhibiting the formation of voids in the distribution of the liquid crystal interval in the active display region. Additionally, the provision of reservoir 7 and vacuum channel 9 are able to accommodate any change in volume of the liquid crystal material when it cools down after the filling operation. Also, the thickness of the reservoir 7 at vacuum channel 9 is such that there is a very readily visible change in appearance of the material in the reservoir when it undergoes a phase change if the temperature reduces to the critical temperature where the material changes from its isotropic phase (a clear appearance) to the nematic (a milky appearance); accordingly, regular inspection of the material in the reservoir allows precise monitoring of the phase state of the material.

In a modification, there is provided either a sloped or a stepped section at the edge of layer 3 to form a graduated interface between the layers 3 and reservoir 7 (rather than the abrupt edge as shown in FIG. 1) thereby to enhance guiding of the material into the active display region.

Figures 4, 5:
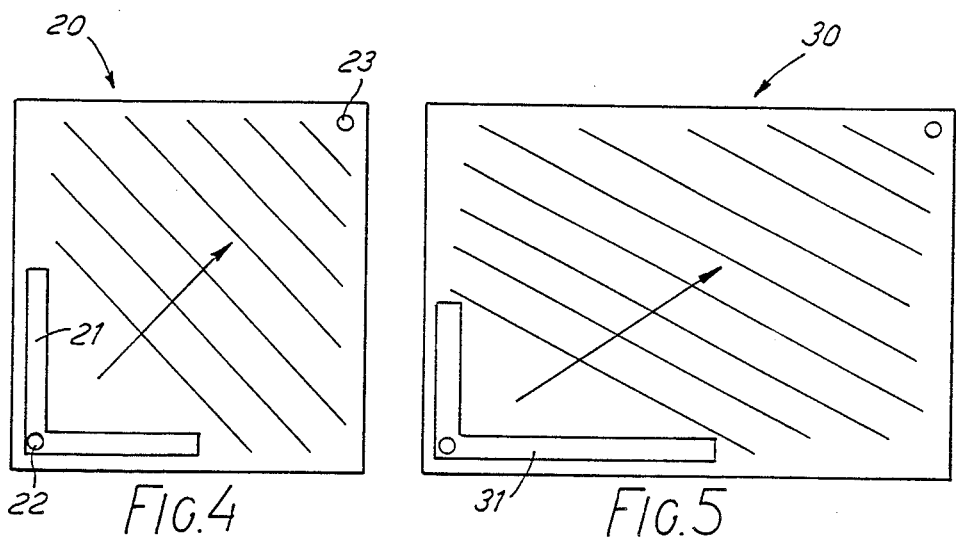
FIGS. 4 to 8 are schematic plan views of other cells embodying the present invention.

FIG. 4 shows schematically an alternative cell 20 embodying the present invention which differs from that of FIGS. 1 and 2 by having an L-shaped reservoir 21 which extends along approximately half of two sides of the cell, a fill-hole 22 which is located at the centre of the L-shape and at a corner of the cell, and a vacuum hole 23 with no vacuum channel.

FIG. 5 shows a modification wherein a cell 30 is rectangular and the reservoir 31 is L-shaped, each arm corresponding to approximately half the length of the appropriate side of the cell.

The cells 20 and 30 can be modified such that an arm of the reservoir extends along the appropriate side of the cell/active display region to a different degree, including the possibility of extending along substantially the entire length of a side. The shape and dimensions of the outlet port of the reservoir affects the shape of the filling front produced, and thereby these parameters of the port are carefully chosen to fit to any given requirements. AdditionallY or alternatively, the cells 20 and 30 may include a vacuum channel in similar manner to channel 9 of cell 1, and optionally the vacuum channel is of similar physical dimensions to the reservoirs 21 and 31.

Figure 6:
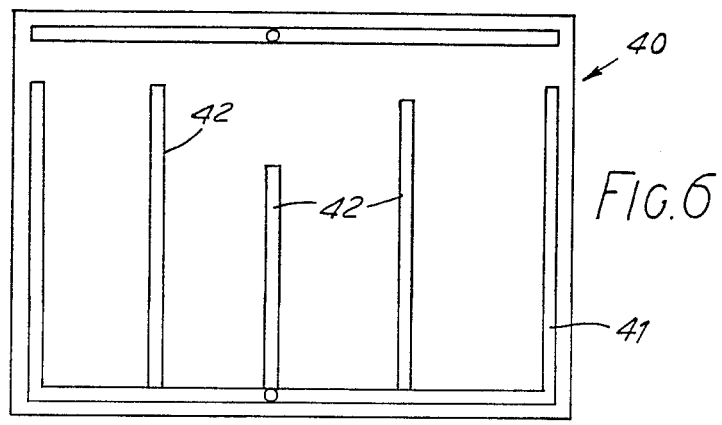

FIG. 6 shows schematically another cell 40 embodying the present invention and having a reservoir 41 with additional branches 42 of various lengths.

Figure 7:
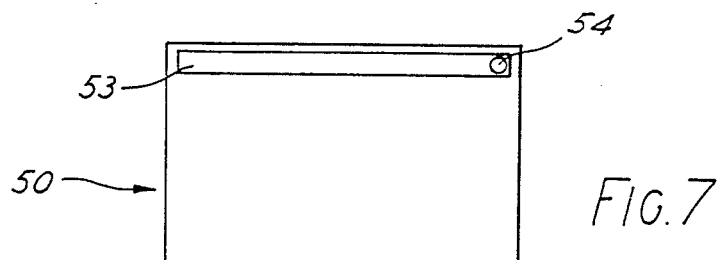

FIG. 7 shows schematically another cell 50 embodying the present invention and having a reservoir 51 which extends along a single side of the cell with a fill-hole 52 located at one end of the reservoir 51. Cell 50 has a vacuum channel 53 which extends along a single side of the cell with a vacuum hole 54 at the end of channel 53 such as to be diametrically opposed to the fill-hole 52 with respect to the cell. The cell may be modified by positioning the fill-hole 52 or the vacuum hole 54, or both, elsewhere along respectively the reservoir 51 and the channel 53.

Figure 8:
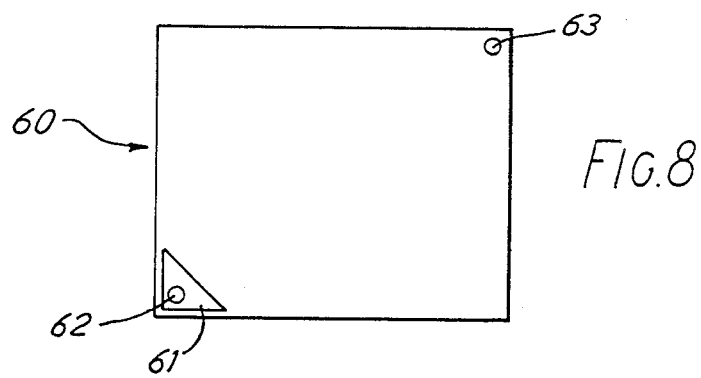

FIG. 8 shows schematically another cell 60 embodying the present invention and having a reservoir 61 which is triangular-shaped in plan with a fill-hole 62 in the corner of the cell and a vacuum hole 63 in the diametrically opposite corner of the cell.

Figure 9:
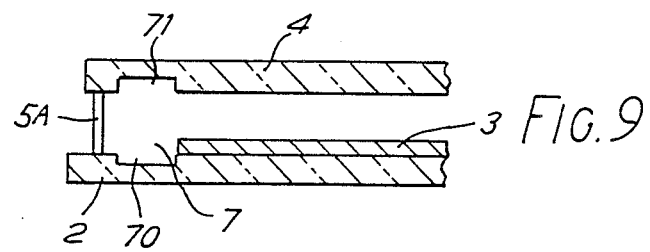
FIG. 9 is a modification to the cell of FIG. 1.

FIG. 9 shows a modification to cell 1 (but which is equally applicable to other embodiments of the present invention) wherein, before assembly of cell 1, each of plates 2 and 4 are recessed (for example by milling or etching) to form grooves 70 and 71 respectively which in due course contribute to formation of the reservoir. Likewise, one or both plates can be recessed to form the vacuum channel.

Any of the illustrated cells can be modified to provide a fill-hole and/or a vacuum hole along the edge of the cell.

Any of the illustrated cells can be modified such that the depth of the reservoir and/or the vacuum channel differs in order to control the filling speed in different parts of the cell.

I claim:

1. A cell for a liquid crystal display device, the cell comprising:
    a first and a second substrate located in a substantially parallel relative arrangement to define an active display region therebetween which can be filled with liquid crystal material, said first and said second substrate being separated in the active display region by a gap having a gap thickness;
    and a reservoir for filling the active display region with liquid crystal material, the reservoir being positioned intermediate and first and said second substrate and having an outlet port which extends along at least a part of an edge of the active display region wherein the reservoir has a width in the dimension corresponding to said gap which is greater than said gap thickness.

2. A cell according to claim 1 wherein said outlet port extends along at least a part of at least two edges of the active display region.

3. A cell according to claim 1 wherein the reservoir produces a filling front of liquid crystal material during filling of the cell with liquid crystal material, and the reservoir is adapted so that said filling front is not substantially parallel to a side of at least one of the cell or the active display region thereof.

4. A cell according to claim 1 wherein the outlet port is of said width in the dimension corresponding to said gap which is greater than said gap thickness.

5. A cell according to claim 1 wherein each substrate has an inner surface corresponding to the interior of the cell and at least one of the substrates includes at said inner surface a section indented relative to said inner surface at the active display region of the substrate, thereby to form the reservoir.

6. A cell according to claim 5, said at least one of the substrates having at least one layer for colour filtering in the active display region wherein said at least one layer is positioned to at least contribute to said inner surface at the active display region and hence to the stepped disposition between the active display region and the indented section.

7. A cell according to claim 1 wherein at least one of the substrates includes a portion which has been recessed to form the reservoir.

8. A cell according to claim 1 wherein one of the substrates has an aperture effective as a fill hole in communication with the reservoir.

9. A cell according to claim 1 further comprising a vacuum hole.

10. A cell according to claim 9 wherein the vacuum hole is disposed in one of the substrates.

11. A cell according to claim 9 further comprising a channel of an increased width, in the respective dimension, to the gap between the substrates in the active display region, the channel being in communication with the vacuum hole.

12. A cell according to claim 1 when filled with liquid crystal material.

13. A method of filling a cell for a liquid crystal display device, the cell comprising:
    a first and a second substrate located in a substantially parallel relative arrangement to define an active display region therebetween which can be filled with liquid crystal material, said first and said second substate being separated in the active display region by a gap having a gap thickness;
    and a reservoir for filling the active display region with liquid crystal material, the reservoir being positioned intermediate said first and said second substrate and having an outlet port which extends along at least a part of an edge of the active display region, the reservoir having a width in the dimension corresponding to said gap which is greater than said gap thickness;
    wherein the method includes the step of filling the reservoir with liquid crystal material whereby the cell is filled with liquid crystal material from at least a part of an edge of the active display region.

14. A method according to claim 13 comprising filling the cell with liquid crystal material from at least a part of at least two edges of the active display region.

15. A method according to claim 13, the cell having a vacuum hole wherein the filling step includes the step of applying a suction pressure to the vacuum hole whereby the rate at which the cell is filled may be controlled.

* * * * *